United States Patent [19]

Mohr

[11] 4,138,642
[45] Feb. 6, 1979

[54] METHOD AND ARRANGEMENT FOR INDIRECTLY ASCERTAINING THE ROTARY SPEED OF A PERMANENT-MAGNET-STATOR D.C. MOTOR

[75] Inventor: Adolf Mohr, Buehlertal, Fed. Rep. of Germany

[73] Assignee: Robert Bosch GmbH, Stuttgart, Fed. Rep. of Germany

[21] Appl. No.: 823,002

[22] Filed: Aug. 8, 1977

[30] Foreign Application Priority Data

Aug. 28, 1976 [DE] Fed. Rep. of Germany ....... 2638954

[51] Int. Cl.$^2$ .......................... G01R 31/02; G01P 3/48
[52] U.S. Cl. ............................. 324/158 MG; 324/173; 324/179
[58] Field of Search ............... 324/158 MG, 173, 179, 324/127, 174, 177

[56] References Cited

U.S. PATENT DOCUMENTS 3,404,339  10/1968  Mitchell ............................. 324/173

Primary Examiner—Rudolph V. Rolinec
Assistant Examiner—Ernest F. Karlsen
Attorney, Agent, or Firm—Michael J. Striker

[57] ABSTRACT

A D.C. motor comprises a permanent-magnet stator including a flux-return structure and at least one permanent-magnet stator magnet mounted on the flux-return structure and also an armature mounted for rotation within the stator and having a circumferential succession of armature teeth. The rotary speed of the armature during operation of the D.C. motor is ascertained indirectly by sensing the variations in the stray flux of the motor at the exterior of the flux-return structure.

11 Claims, 3 Drawing Figures

METHOD AND ARRANGEMENT FOR INDIRECTLY ASCERTAINING THE ROTARY SPEED OF A PERMANENT-MAGNET-STATOR D.C. MOTOR

BACKGROUND OF THE INVENTION

The invention relates to methods and devices for ascertaining the rotary speed of a motor, particularly a permanent-magnet-stator D.C. motor.

It is very well known to ascertain the rotary speed of a motor using means which cannot be kept out of physical contact with the motor. The most familiar of these is of course a tachometric generator whose rotating structure is mounted on the motor shaft for rotation therewith and which is operative for generating an output signal indicative of the rotary speed of the motor. However, using a tachometric generator to ascertain rotary speed subjects the motor to an additional mechanical load, which may be disadvantageous in itself and/or may detract from the accuracy of the rotary-speed information required in certain practical applications.

It is also known to ascertain the rotary speed of a motor using means which need not physically contact the motor. The most familiar of these is a photoelectric speed detector. A bright marking, or the like, is provided on the output shaft of the motor and repeatedly moves past a stationary photoelectric sensing device. The output signal of the photoelectric sensing devices is comprised of repeated dark-light and light-dark transitions, and is typically integrated with respect to time before it can be converted into an actual rotary-speed indication.

SUMMARY OF THE INVENTION

It is a general object of the invention to provide a novel method and arrangement for measuring the rotary speed of a permanent-magnet-stator D.C. motor which is of a simpler character than what is known and used in the prior art.

It is another object to provide a novel method which can be very easily and reliably employed to measure the rotary speed of a motor of the type in question, without requiring modifications of or additions to the motor structure per se.

It is a further object to provide a novel method which can be employed to measure the rotary speed of an existing motor not designed to include a built-in speed indicator.

It is a further object to provide a novel method and arrangement which can be employed even when the moving parts of the motor are more or less completely inaccessible, for example when the motor output shaft driving the load is very short and/or inaccessible.

It is another object to provide a method and arangement involving the use of a sensing means which can by very readily built-in into the mounting structure, support structure, or the like, of the motor.

These objects can be achieved by ascertaining the rotary speed of the armature during operation of the D.C. motor indirectly, by sensing the variations in the stray flux of the motor at the exterior of the flux-return structure thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
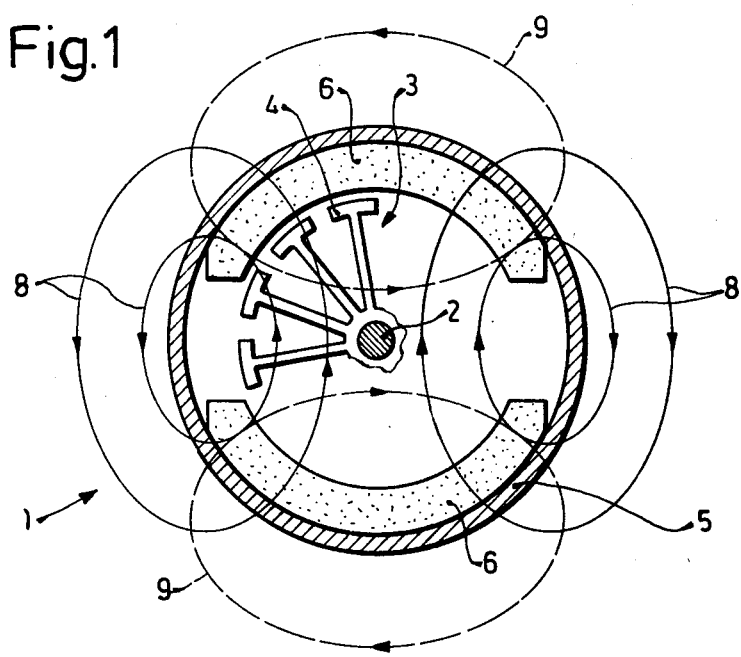
FIG. 1 depicts a permanent-magnet-stator D.C. motor.

FIG. 1 depicts in a sectional view a permanent-magnet-stator D.C. motor. The motor includes a stator 1 and, coaxial therewith, an armature 3 mounted for rotation on a shaft 2. The armature 3, of which only a part is depicted in FIG. 1, is provided with an even number (twelve) of armature teeth 4 which, in conventional manner, define an equal number of intermediate winding slots and carry a plurality of (non-illustrated) armature windings.

The stator 1 is comprised of a closed flux-return structure 5 made of iron, and here provided in the form of a cylindrical casing. Mounted on the inner peripheral surface of the cylindrical flux-return structure 5 are two diametrically opposite permanent-magnet stator magnets 6. The stator magnets 6 are secured to the flux-return structure in any conventional way.

In FIG. 1, numerals 8 and 9 denote the closed lines of stray flux emanating from the flux-return structure 5 and passing through free air. The stray flux emanating from flux-return structure 5 is comprised of two components 8 and 9. Stray flux component 8 is attributable to the stator field of the permanent magnets 6. Stray flux component 9 is generally perpendicular to stray flux component 8 and is attributable to the transverse flux of the armature 3. Of course, the transverse armature flux does not come into existence until the (non-illustrated) armature windings are energized through the intermediary of (likewise non-illustrated) collectors, or the like.

Figure 2:
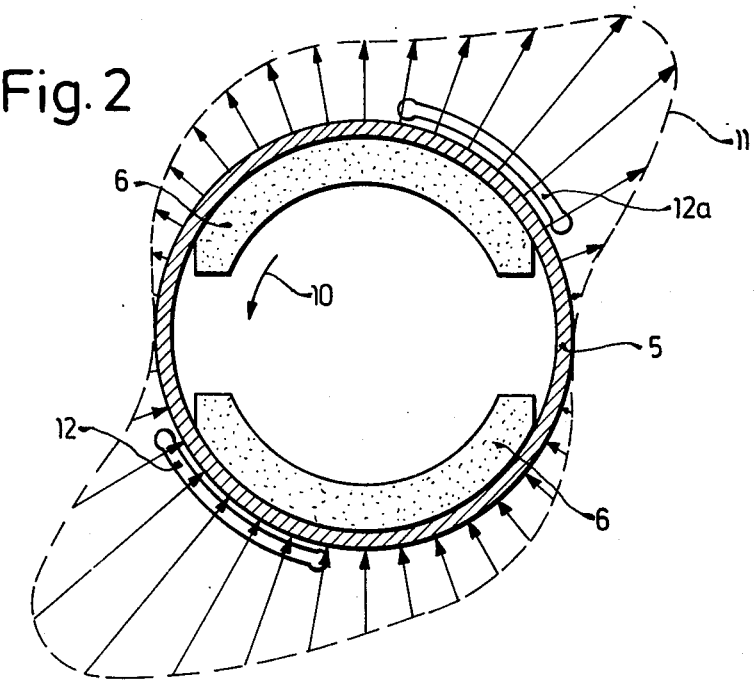
FIG. 2 depicts the stray flux of the structure of the motor of FIG. 1.

When armature 3 turns in the direction of arrow 10 (FIG. 2), the stray flux distribution depicted in FIG. 2 is established. It will be appreciated that the flux-return structure 5 is at maximum magnetic saturation at the regions thereof adjoining the leading ends of the stator magnets 6; accordingly, the stray-flux induction is likewise maximum at these locations. It will be noted that, in the vicinity of the leading ends of the magnets 6, the stray-flux flux lines of the stator field and of the transverse armature field combine, whereas in the vicinity of the trailing ends of the magnets 6, the stray-flux flux lines of the stator field and of the transverse armature field oppose. At this region of maximum saturation there is arranged a sensing coil 12, located at the exterior of the flux-return structure 5. The axis of coil 12 is oriented perpendicular to the rotation axis of armature 3.

During operation of the motor, the spatial variations in the magnetic conductivity of the motor structure as the armature thereof rotates make themselves felt most strongly at the exterior of the flux-return structure 5 in the region of maximum saturation, where the coil 12 is disposed. The periodic variations in the stray flux passing through coil 12 induce therein a voltage which varies with corresponding periodicity. The frequency of this induced voltage, when divided by the number of winding slots in the armature 3, is directly indicative of the rotary speed of the motor. The voltage variations induced in the coil 12 are applied to a conventional pulse-shaping circuit 13 (FIG. 3) and converted into a train of well-shaped pulses which, in turn, are applied to a counting apparatus 14. Counting apparatus 14 can be such as to furnish a direct digital read-out of motor speed.

Figure 3:
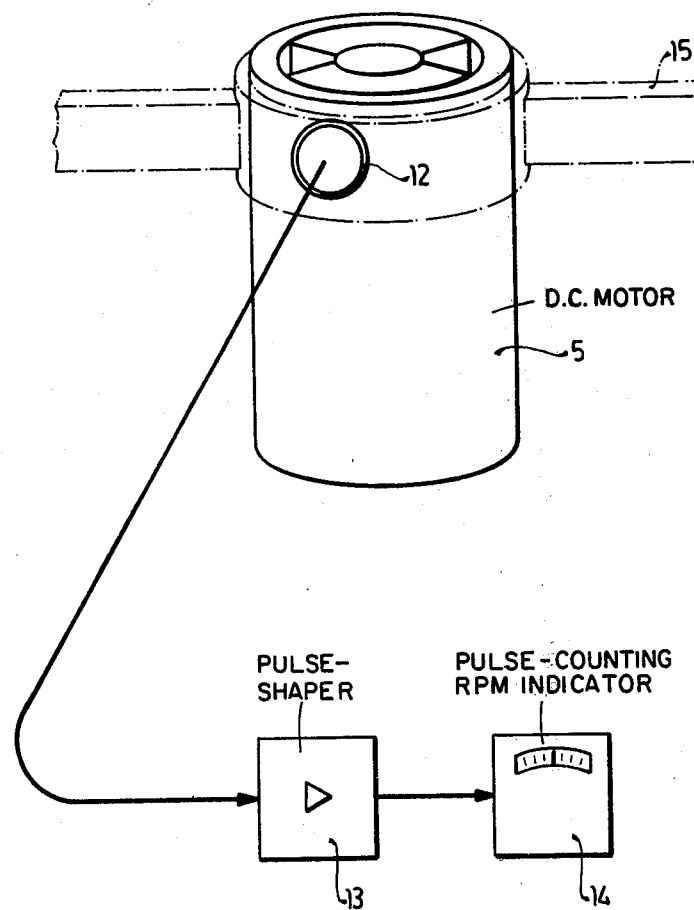
FIG. 3 is a schematic depiction of the motor of FIG. 1 mounted in a support structure, with a sensing device for ascertaining rotary speed built-in into the support structure.

FIG. 3 shows the motor, whose outermost part is the flux-return structure 5 thereof, mounted in a mounting structure 15. Here, the sensing coil 12 is arranged on the mounting structure 15 itself. The mounting structure 15 may be the structure which mounts the motor during actual use of the motor for its intended purpose. Or the mounting structure 15 may be a test mount into which a motor whose speed is to be checked is removably inserted, for a speed check by sensing coil 12. The sensing coil 12 could be properly arranged at the exterior of the flux-return structure 5 in a variety of other ways.

In the motor of FIGS. 1 and 2, comprised of one pole pair and an even number of armature winding slots, if it is desired to increase the amplitude of the speed-dependent signal, use can be made of a second sensing coil 12a arranged diametrically opposite to first sensing coil 12, with the two coils being connected in series so that the two voltages induced therein will be superimposed. In general, if the number of armature slots per stator pole pair is even, the strength of the speed-dependent signal can be boosted by connecting a plurality of such sensing coils in series.

Sensing means other than sensing coils could in principle be utilized to sense the variations in the stray flux in question.

It will be understood that each of the elements described above, or two or more together, may also find a useful application in other types of construction differing from the types described above.

While the invention has been illustrated and described as embodied in a permanent-magnet-stator D.C. motor of particular design, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a method of ascertaining the rotary speed of a D.C. motor, the D.C. motor comprising a permanent-magnet stator including a flux-return structure and at least one permanent-magnet stator magnet mounted on the flux return structure and an armature mounted for rotation within the stator and having a circumferential succession of armature teeth, the permanent-magnet stator magnet having leading and trailing end portions as considered in the direction of rotation of the motor armature, the method comprising ascertaining the rotary speed of the armature of the D.C. motor indirectly by sensing the variations in the stray flux of the motor at the exterior of the flux-return structure at a location adjacent the leading end of the stator magnet.

2. In combination with a D.C. motor comprising a permanent-magnet stator including a flux-return structure and at least one permanent-magnet stator magnet mounted on the flux-return structure and an armature mounted for rotation within the stator and having a circumferential succession of armature teeth, the permanent-magnet stator magnet having leading and trailing end portions as considered in the direction of rotation of the motor armature; an arrangement for ascertaining the rotary speed of the armature during operation of the motor, said arrangement comprising means positioned for sensing the variations in the stray flux of the motor at the exterior of the flux-return structure at a location adjacent the leading end of the stator magnet.

3. The method defined in claim 1, sensing said variations using a coil, and orienting the coil such that the variations in the stray flux passing through the coil during rotation of the armature induce in the coil a voltage varying at a rate dependent upon the rotary speed of the armature.

4. The method defined in claim 3, the ascertainment of the rotary speed of the armature further comprising using a pulse-shaping circuit to convert the varying voltage induced in the coil into a train of shaped pulses and applying the pulses to a counter.

5. The combination defined in claim 2, said means comprising a coil and oriented such that the variations in the stray flux passing through the coil during rotation of the armature induce in the coil a voltage varying at a rate dependent upon the rotary speed of the armature.

6. The combination defined in claim 5, said means further comprising a pulse-shaping circuit connected to the coil for converting the varying voltage induced in the coil into a train of shaped pulses and a counter connected to receive the train of shaped pulses and count the pulses.

7. The combination defined in claim 2, said means comprising a coil positioned at least approximately directly adjacent the exterior of the flux-return structure, the coil having a coil axis oriented normal to the rotation axis of the motor armature.

8. The combination defined in claim 7, the outer periphery of said coil being located just past the leading end of the stator magnet as considered in the direction of rotation of the motor armature.

9. The combination defined in claim 2, said means comprising a plurality of coils each positioned adjacent a respective location of maximum magnetic saturation of the stator structure of the motor and each oriented such that variations in the stray flux passing through the coil during rotation of the armature induce in the coil a voltage varying at a rate dependent upon the rotary speed of the armature, the coils being connected in series so that the varying voltages induced therein are superimposed.

10. The combination defined in claim 9, the armature having winding slots defined intermediate the armature teeth, the number of windings slots being an even number, the at least one stator magnet defining at least one pair of associated stator poles, the plurality of coils comprising at least one pair of coils, one coil of a coil pair being located adjacent one pole of a stator pole pair and the other coil of a coil pair being located adjacent the other pole of the respective stator pole pair.

11. The combination defined in claim 2, the motor being provided with a mounting structure for supporting the motor, said means being arranged on the mounting structure.

* * * * *